US005805173A

United States Patent [19]
Glennon et al.

[11] Patent Number: 5,805,173
[45] Date of Patent: Sep. 8, 1998

[54] SYSTEM AND METHOD FOR CAPTURING AND TRANSFERRING SELECTED PORTIONS OF A VIDEO STREAM IN A COMPUTER SYSTEM

[75] Inventors: Stephen G. Glennon; Daniel P. Mulligan; Paul B. Wood, all of Austin, Tex.

[73] Assignee: Brooktree Corporation, San Diego, Calif.

[21] Appl. No.: 537,491

[22] Filed: Oct. 2, 1995

[51] Int. Cl.$^6$ ..................................................... G06T 1/00
[52] U.S. Cl. ........................... 345/501; 345/507; 348/571; 348/468; 348/525
[58] Field of Search ..................................... 395/501, 502, 395/507–509, 806–807, 302; 345/185, 189, 201; 348/465, 468, 474–478, 525, 571; 364/514 R

[56] References Cited

U.S. PATENT DOCUMENTS

| | | | |
|---|---|---|---|
| 4,774,576 | 9/1988 | Lilley | 358/141 |
| 4,894,789 | 1/1990 | Yee | 364/521 |
| 5,249,050 | 9/1993 | Zato | 358/147 |
| 5,283,648 | 2/1994 | Jeong | 348/468 |
| 5,335,321 | 8/1994 | Harney et al. | 395/162 |
| 5,339,160 | 8/1994 | Shindou | 348/571 |
| 5,347,365 | 9/1994 | Harigai et al. | 348/525 |
| 5,438,370 | 8/1995 | Primiano et al. | 348/478 |
| 5,440,683 | 8/1995 | Nally et al. | 395/162 |
| 5,517,612 | 5/1996 | Dwin et al. | 345/501 |
| 5,543,824 | 8/1996 | Priem et al. | 345/201 |

FOREIGN PATENT DOCUMENTS

| | | | |
|---|---|---|---|
| 597 218 A1 | 5/1994 | European Pat. Off. | G09G 1/16 |
| 675 478 A1 | 10/1995 | European Pat. Off. | G09G 1/16 |

OTHER PUBLICATIONS

U.S. Application No. 08/099,194 filed Jul. 29, 1993, for *Video Processing Apparatus, Systems and Methods*.
Copies of Presentation Slides, Pixel Semiconductor, Jun. 1992.
M. Leonard, *Teleconferencing Invades the Desktop*, Electronic Design, Aug. 6, 1992, pp. 47, 48, 50, 51.
Digital Video Processor, *Video–Port Interface Techniques*, draft May 17, 1993, Pixel Semiconductor.
Digital Video Processor, Preliminary Data Book, Jul. 1993, pp. C00001–C00229.
i750™ Microprocessor Family, Intel Corp., 1991, pp. BT035378–BT035496.
K. Jack, Video Demystified A Handbook For The Digital Engineer, 1993, pp. 178–185 and 250.

*Primary Examiner*—Kee M. Tung
*Attorney, Agent, or Firm*—William C. Cray; Susie H. Oh

[57] ABSTRACT

Aspects of the present invention provide a system for selectively processing a video signal in accordance with instructions from application software. The system contains a video decoder for converting an analog video signal to digital video data, and a controller for formatting and routing the digital video data. A list of control structures may be loaded into a memory associated with the controller. The control structures contain formatting and routing information used by the controller to process different portions of the video stream. The number and content of control structures as well as the correlation between the control structures and selected portions of the video stream may be flexibly determined by application software. In particular, the control structures may be configured such that certain portions of the video stream are routed to the CPU for processing, while other portions are routed to a display driver and output on a display device.

36 Claims, 6 Drawing Sheets

SYSTEM AND METHOD FOR CAPTURING AND TRANSFERRING SELECTED PORTIONS OF A VIDEO STREAM IN A COMPUTER SYSTEM

FIELD OF THE INVENTION

The field of the present invention relates generally to video systems, and more particularly to a system and method for selectively processing portions of a video stream in a computer.

BACKGROUND OF THE INVENTION

Standard video formats, such as NTSC and PAL, include both active video data and video control information. The active video data includes data that determines the intensity and color of pixels displayed on a television or video monitor. Typically, the television or video monitor uses a cathode ray tube (CRT) to draw an image on the screen. Active video data may be either non-interlaced or interlaced. For non-interlaced video data, the CRT draws both even and odd lines of active video data each time it traverses the screen. For interlaced video data, the CRT draws only half of the lines (either the even lines or the odd lines) each time it traverses the screen. The video data for a screen of interlaced video is referred to as a field, and two fields of complete video data (which is a full screen of data) are referred to as a frame. Interlaced video requires only half as much active video data as non-interlaced video, and is the standard format for modern television signals.

When the CRT draws an image on the screen, it typically starts at the top left corner of the screen and moves horizontally across the screen to draw a horizontal line of active video. Each horizontal line of active video data is followed by horizontal video control information. This horizontal video control information causes the CRT to return to the right side of the screen and drop down to the next horizontal line. For interlaced video, the CRT would drop down two lines to the next even or odd line as appropriate. The CRT is blanked during this period of time (referred to as the horizontal blanking interval), so it will not overwrite the horizontal line it just drew. The horizontal blanking interval terminates with a horizontal synchronization signal (HSYNC) that causes the CRT to start drawing the next horizontal line of active video data.

Each screen of active video data and horizontal video control information is followed by vertical video control information. The vertical video control information blanks the CRT and causes it to return to the top left corner so the next screen of active video may be displayed. This period of time is referred to as the vertical blanking interval. The vertical blanking interval is longer than the horizontal blanking interval, because the CRT traverses the entire screen. As a result, hidden text or other data may be provided during the vertical blanking interval. For instance, closed captioning and teletext are two standard formats for providing encoded text and related formatting information during the vertical blanking interval.

A large variety of circuits have been designed for processing video. Most televisions include a circuit for decoding closed captioning data and displaying it on the screen concurrently with active video data. Other circuits have been designed for interlacing or deinterlacing video signals or for converting analog video signals into digital form for processing using a microprocessor. Some circuits also decode closed captioning information and send it to a microprocessor or memory for subsequent digital processing while sending active video data directly to the screen for display.

Typical video processing systems use a separate character ROM and circuitry for decoding closed captioning or teletext information. These extra components add to the cost of the system. In addition, conventional video processing systems typically do not provide sufficient flexibility for use in modern multimedia computers unless a separate microprocessor is used for video processing. What is needed is a system and method for real time processing of video data in a multimedia computer system without requiring a separate microprocessor or character ROM. Preferably, such a system would support a variety of video formats and resolutions, interlacing and deinterlacing, and decoding of closed captioning and teletext information using inexpensive and flexible hardware. Preferably, such a system would allow application software to determine how different portions of a video stream are processed. Application software would preferably control the format and resolution of the active video data as well as the decoding of the closed captioning and teletext information.

It is also desirable to decrease the bandwidth required for processing video in personal computers. Bandwidth is particularly important in multimedia systems that concurrently process graphics, video and audio data. What is needed is a system and method for displaying active video data, while allowing closed captioning or teletext information to be efficiently transferred across a system bus for decoding and processing by a microprocessor. Preferably such processing would occur concurrently with processing of graphics and audio data.

SUMMARY OF THE INVENTION

Aspects of the present invention provide a system for selectively processing a video signal in accordance with instructions from application software. The system contains a video decoder for converting an analog video signal to digital video data, and a controller for formatting and routing the digital video data. A list of control structures may be loaded into a memory associated with the controller. The control structures contain formatting and routing information used by the controller to process different portions of the video stream. The number and content of control structures as well as the correlation between the control structures and selected portions of the video stream may be flexibly determined by application software. In particular, the control structures may be configured such that certain portions of the video stream are routed to the CPU for processing, while other portions are routed to a display driver and output on a display device.

It is an advantage of the above aspects of the present invention that the video processing hardware may be relatively simple and the formatting and routing of video data may be flexibly determined by application software. A variety of video formats can be supported and a separate microprocessor is not required.

Aspects of the present invention may also be used to capture text-based (e.g., closed captioning or teletext) data in a memory associated with the controller. For instance, closed captioning data for multiple frames of video may be captured and stored in a buffer in the memory. An interrupt signal is generated when a desired amount of data has been captured (such as closed captioning data from 30 consecutive frames which may be a full second of video). The CPU can then retrieve the data for processing and new closed captioning data may be continuously captured using double buffering techniques.

As a result, the CPU can be used to process closed captioning or teletext data with infrequent interrupts and reduced bus traffic. In particular, high speed block transfer commands may be used to transfer the captured data rather than transferring the data piecemeal as it is received. Active video data may be continuously displayed without interruption from this capture process. These aspects of the present invention are particularly useful in multimedia systems where bandwidth and processing power are at a premium, because a large amount of audio, graphics, and video data may need to be processed and transferred across the system bus.

Another aspect of the present invention allows the controller to capture selected portions of the video data for subsequent processing by the CPU, in addition to sending the video data to the display driver. Control structures are created for selected portions of the video stream with instructions that tell the controller how to process and route each portion. These control structures cause the controller to interrupt the CPU when a threshold amount of data has been captured. The CPU then processes the captured video data without interfering with the ongoing display of active video.

These and other aspects and advantages of the invention may be understood by referring to the following description taken in conjunction with the accompanying drawings.

DETAILED DESCRIPTION OF THE INVENTION

Figure 1:
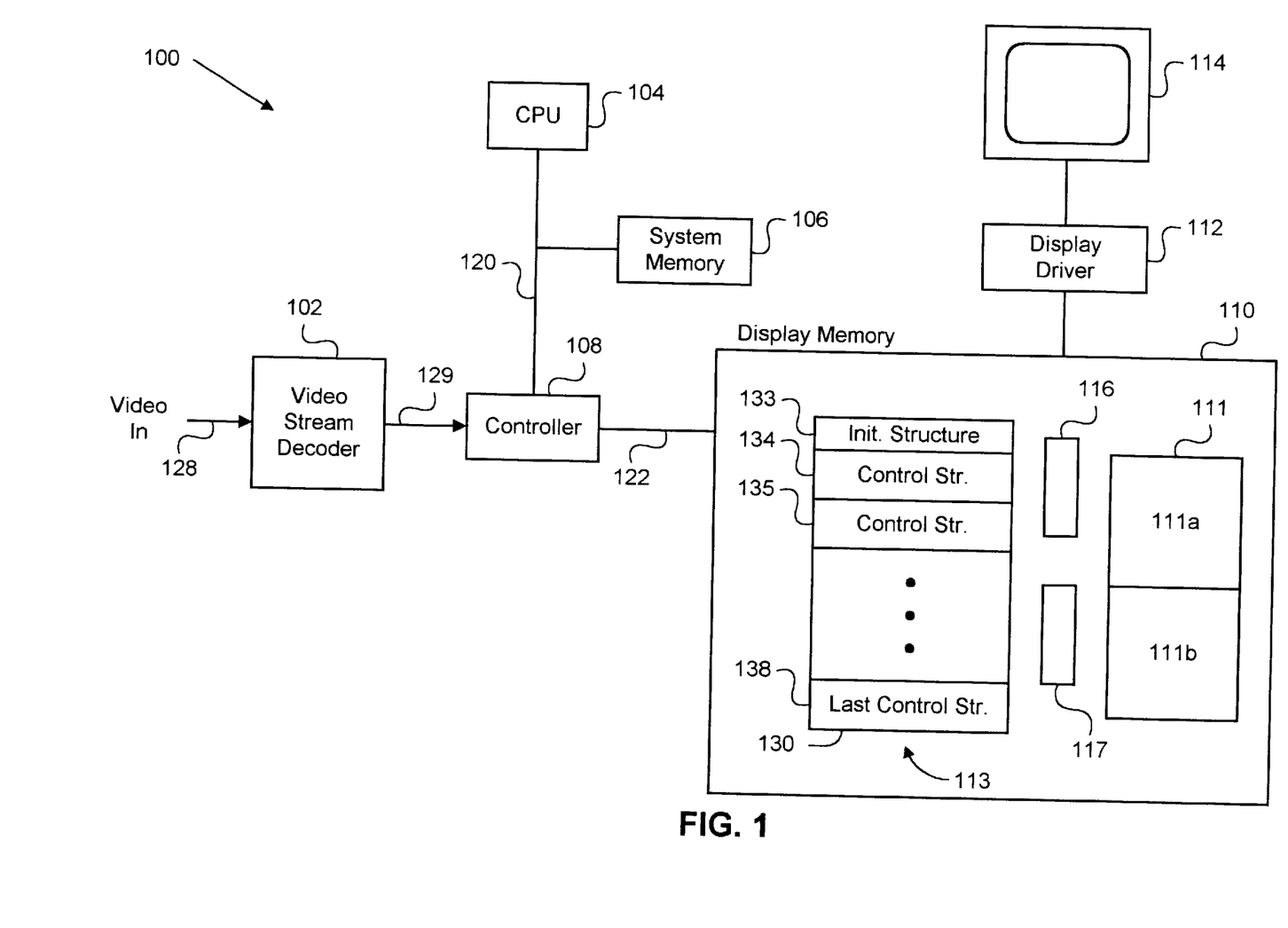
FIG. 1 is a drawing showing a video system according to an exemplary embodiment of the present invention.

FIG. 1 is a block diagram of a system 100 according to an exemplary embodiment of the present invention. System 100 comprises a video stream decoder 102, a central processing unit ("CPU") 104, system memory 106, a video controller 108, display memory 110, a display driver (such as a RAMDAC) 112, and a display unit 114. Basically, system 100 performs the following operations: (i) accepts an analog video signal on line 128; (ii) converts the video signal to a stream of digital video data; (iii) formats and stores active video data and/or text-based data, such as closed captioning or teletext data, in the display memory and captures selected portions of the data in a separate buffer in the display memory; (iv) processes and displays the video and/or text-based data that is stored in the display memory; and (v) sends the separately captured portions to CPU 104 or system memory 106 for further processing. The separately captured portions of data may be sent to the CPU or system memory after a threshold amount of data has been captured. Use of a threshold to trigger this transfer reduces the interrupt frequency and bandwidth required to process the captured data.

Any variety of processing may be applied to the selectively captured data after it is transferred to the CPU or system memory. For instance, the selectively captured data may comprise multiple frames of closed captioning or teletext information. The CPU may search through this data for selected words or phrases. The data may also be modified and returned to the display memory for subsequent display. The video data that was not separately captured (in this case, active video) may be continuously displayed without interruption by this processing.

Alternatively, selected portions of the active video data may be captured and sent to the CPU. The active video stream may also be buffered in the display memory for subsequent display. In some embodiments, the selected portions of the active video may be included in the stream of data that is displayed and in other embodiments the selected portions may be removed. In embodiments where selected portions are both captured and displayed, copies of the selected portions may be captured and transferred to the CPU for subsequent processing.

The operation of the components of system 100 will now be described. Controller 108 provides an interface to display memory 110 for sources of graphics and video information. For instance, CPU 104 may send graphics data from system memory 106 to the display memory 110 for subsequent display using conventional memory mapped I/O. A portion of the virtual address space of CPU 104 is set aside for the display memory. CPU 104 asserts an address corresponding to the display memory 110 on the address lines of the system bus 120 and asserts the graphics data on the data lines of the system bus 120. The system bus is preferably a local bus, such as a VESA local bus or PCI bus, although other bus architectures may be used as well. When CPU 104 transfers a block of graphics data, conventional high speed block transfer commands may be used. Controller 108 detects addresses corresponding to display memory 122 and routes the graphics data to display memory 110 over bus 122. The addresses received by controller 108 are converted to display memory addresses. For instance, the controller 108 may use only the least significant bits from the virtual memory address received on system bus 120 to address the display memory over bus 122, although other addressing techniques may be used as well. CPU 104 may also read data from display memory 110 using similar techniques.

A particular address range in display memory 110 may be set aside for data to be displayed. This address range defines a buffer 111 set aside for display data. Data loaded into the buffer may be sent to the display driver 112 sequentially, converted to analog form, and output on the display device 114 at a desired pixel clock rate. It will be readily understood that buffer 111 may comprise two portions 111a and 111b so double buffering techniques may be used. Double buffering allows data to be loaded into one portion of buffer 111 while it is being read out of another portion without interruption.

Display data may also be provided by sources other than the CPU. In particular, an input analog video signal may be provided on input line 128. The input analog video signal may be obtained from TV tuners, VCRs, cameras, or other video sources. Video stream decoder 102 converts the input analog video signal into a desired digital format. The output of video stream decoder 102 is a stream of digital video data in one of several digital formats (e.g., RGB or 4:2:2 YCrCb).

The stream of digital video data generated by video stream decoder 102 is transferred to controller 108. The digital video data may be transferred across an external bus 129 or the video stream decoder and controller 108 may reside on a single integrated circuit device. Controller 108 formats the digital video data and routes it to desired locations in the display memory 110. The formatted digital video data may be routed to buffer 111 for subsequent display. The general flow of data is from decoder 102 to controller 112 to display memory 110 to display driver 112 to display unit 114. Portions of the stream of digital video data may also be captured in separate buffers, such as buffers 116 and 117, for separate processing.

Although the general flow of data does not require processing by CPU 104, the operation of controller 108 may be flexibly determined by application software executed by CPU 104. In particular, a memory space 113 may be set aside in display memory 110 for storing a control structure list 130 which controls the operation of controller 108. The control structure list 130 may be downloaded to memory space 113 by the application software in advance of the processing of video input data. The application software also stores a pointer to memory space 113 in a video address register in controller 108. Since the control structure list 130 is downloaded in advance, application software can flexibly determine the operation of controller 108 without requiring traffic on system bus 120 during the actual processing of video input data.

An exemplary structure for control structure list 130 is shown in FIG. 1. At the top of list 130 is an "Init Structure" 133, which contains initialization information for the controller 108. The control structure list 130 also contains a plurality of control structures 134–138, each of which corresponds to a portion of the stream of digital video data input to controller 108. The contents of these control structures determine the manner in which the stream of digital video data (including active video and video control information) is processed.

Each control structure comprises three DWORDs in the exemplary embodiment. The bits in each DWORD may be set to select a wide variety of video processing options. Each control structure has settings that determine the portion of each field of video data that should be processed using the information in the current control structure. For instance, the starting vertical line in a field and the number of vertical lines to be processed may be indicated in each control structure 134–138. The control structure also has a one bit flag that indicates whether the control structure corresponds to an even or odd field. Other settings determine how the video data corresponding to the control structure should be formatted (i.e., 4:2:2 resolution, 4:1:1 resolution, mono-use luminance values only, or 4:2:2 at one quarter resolution for video icon), whether the data should be stored in the display memory 110 or discarded, and where in the display memory the data should be stored. Importantly, different portions of the stream of digital video data may be sent to different buffers in the display memory 110 for separate processing.

Any variety of formats (e.g., number of bits and the specification for each bit) may be used for init structure 133 and control structures 134, 135, and 138. A detailed description of a format used for an exemplary control structure list 130 is shown in the technical specification for Brooktree Corporation's BtV2115 integrated circuit, entitled "MediaStream Controller," dated Feb. 3, 1995 in the section describing the Video Input Subsystem at pages 265–280, which is hereby incorporated herein by reference in its entirety. This technical specification is incorporated herein by reference.

The controller 108 loads the values from the first control structure 134 into internal registers that determine the operation of the controller 108. The controller 108 then processes the corresponding portion of the stream of digital video data. After that portion has been processed and routed to the display memory (or alternatively discarded), the next control structure 135 from the control structure list 130 is loaded. This process continues until the last control structure 138 is loaded. The last control structure 138 has a flag set that tells the controller 108 to return to the top of the control structure list 130 for further processing.

The control structures have a variety of other settings that control the detailed processing and routing of digital video data. For instance, a pause flag may be set to halt processing after the video data corresponding to the current control structure has been processed. An interrupt flag may be set to cause the controller to generate an interrupt for the CPU 104 after the video data corresponding to the current control structure has been processed. Yet another flag causes the controller to toggle between buffers in display memory (such as buffers 111a and 111b) for outputting digital video data to display driver 112. This allows double buffering to be used to process the data. The controller causes data to be sent from one of the buffers (e.g. 111a) to the display driver 112, while storing a new frame of video data in the other buffer (e.g. 111b). Another setting in the control structures determines the line pitch to use when storing data in the display memory 110. The line pitch determines the number of addresses in the display memory 110 to advance after each line of video data is stored. This setting can be used to deinterlace video data. For deinterlacing, separate control structures may be used to capture active video data from even and odd fields. The control structure for the even active video data would indicate that the data should be stored starting at the first even line address of a buffer in the display memory (such as buffer 111a or 111b) using a line pitch equal to two lines of active video data. The even data will then be stored in every other line of the buffer. The control structure for the odd active video data indicates that the data should be stored starting at the first odd line address of the same buffer using a line pitch equal to two lines of video data. This fills in the odd active video data so the buffer contains a complete frame of deinterlaced active video data.

Thus, to process and deinterlace active video, a control structure list having two control structures may be loaded into the display memory in advance. The first control structure captures active video data from an even field using a line pitch equal to twice the number of DWORDs in a line of active video data. The second control structure captures active video data from an odd field using a line pitch equal to twice the number of DWORDs in a line of active video data. The controller 108 loops through the list, continuously processing and deinterlacing active video without the use of CPU 104. The last structure in the list toggles the buffer being used to store the data for double buffering and causes the controller to return to the top of the list to process the next frame.

Application software can simply load a different control structure list to flexibly alter the way video input data is processed. For instance, the application software may use two control structures to display video data in CIF resolution. The first control structure is set up to wait for an even field and discard the video data for that field. The second control structure is set up to wait for line 22 of an odd field (the start of the odd active video data) with a 4:1:1 format mode. The second control structure is set up to process 240 lines which is a field of odd active video. The line pitch is set to the number of DWORDs in a line of active video. The second control structure also has a flag set that causes the controller 108 to loop to the top of the control structure list to process the next frame. Thus, the controller loops through the control structure list to repetitively process frames of video data for display in CIF resolution. Double buffering may be used, but is not required. When double buffering is not used, controller 108 must coordinate the input of data to, and the output of data from, a circular buffer in display memory 110.

The above system allows video data to be flexibly and efficiently processed using relatively simple hardware. CPU 104 does not have to be actively involved in processing the video. It may be desirable, however, to route certain information to the CPU for additional processing. The application software may set the video interrupt flag to allow the CPU to retrieve and process selected data. The video interrupt flag causes the controller 108 to generate an interrupt when the corresponding portion of the stream of digital video data has been processed. CPU 104 can then access the captured data using memory mapped I/O and load it into system memory 106 for subsequent processing.

As an example, text-based information (such as closed captioning or teletext data) that is provided during the vertical blanking interval may be routed to a buffer (such as buffer 116 or 117) in the display memory separate from the buffer 111 used to store active video data for subsequent display. In particular, a control structure may be configured to capture closed captioning information which is encoded on line 21 of the odd field of a standard television video signal. To process such a video signal, the control structure list 130 may contain three control structures for processing the stream of digital video data: a first structure (e.g., structure 134) for processing the active video in each even field, a second structure (e.g., structure 135) for processing text-based data in the vertical blanking interval of each odd field, and a third structure (e.g., structure 138) for processing the active video in each odd field. For capturing closed captioning data the second control structure 135 would have a starting vertical line of twenty one and the number of vertical lines would be set to one. This captured vertical line from the blanking interval would be sent to buffer 116 or 117 (or toggled between the two for double buffering). The active video data, on the other hand, would be routed to buffer 111 for subsequent display. Controller 108 would loop through the control structures continuously, capture the closed captioning information, and separately process the active video without interruption.

In the above example, the video interrupt flag may be set in the third control structure so the controller generates an interrupt each time it loops through the list. CPU 104 may then retrieve the closed captioning data for further processing. The closed captioning for each odd field may comprise up to two characters in seven bit ASCII format with odd parity. CPU 104 may convert the closed captioning to graphics format and download it to display memory 110 using memory mapped I/O for subsequent display. Thus, closed captioning data may be overlaid on the active video data without a separate microprocessor or character lookup table in controller 108. In addition, CPU 104 may perform other digital processing on the closed captioning data. For instance, the CPU 104 may search for certain words or phrases in the closed captioning data.

Capturing the closed captioning data after each field or frame, however, is not desirable due to the high interrupt frequency (which may be 30 times a second for 30 frame per second video) and the increased bus traffic on system bus 120. To reduce the interrupt frequency and decrease bus traffic, the control structure list 130 may be extended. For instance, a list of control structures is preferably set up to process thirty frames of video (which is a full second of video at thirty frames a second) when capturing closed captioning data in the exemplary embodiment. Each frame may be processed by three control structures: a control structure to capture the even field of active video data, a control structure to capture closed captioning data from line 21 of the odd field, and a control structure to capture the odd field of active video data. The even and odd active video data may be sent buffer 111 (or alternatively to buffers 111a and 111b for double buffering) for subsequent display. The closed captioning data from all thirty frames may be sent to buffer 116.

When this configuration is used, only the last control structure has the video interrupt flag set, so only one interrupt is generated for every second of video. CPU 104 can then retrieve and process a full second of closed captioning data from buffer 116 (which may be as much as sixty ASCII characters, although typically data is not sent at the maximum rate). The controller 108 then loops to the beginning of the list of control structures to continue processing the stream of digital video data. The last control structure 138 may be configured to cause the controller 108 to toggle to buffer 117 for capturing closed captioning data. This technique allows new closed captioning data to be captured in buffer 117, while the CPU retrieves the previous second of closed captioning data from buffer 116. Each time the controller 108 loops through the list of control structures the controller may toggle between buffers 116 and 117 to provide double buffering.

With the above technique for capturing closed captioning data, only one interrupt is generated every second, and all of the captured data may be transferred in a single block. As a result interrupt frequency, system bus traffic, and the amount of CPU processing time required is decreased. Usually, much less than sixty characters a second of closed captioning are received in a television signal. In most circumstances, CPU 104 can convert the closed captioning to graphics form and send it to display memory 110 for display with acceptable synchronization with the active video.

It will be readily apparent that any variety of thresholds may be used to control the frequency of interrupts. A shorter or longer list of control structures (such as 15 frames or 45 frames) could be used. The list could be set up to correspond to portions of video of a variety of lengths (such as half a second or one and a half seconds). What is desired is a list of control structures that processes multiple frames of video for each interrupt generated. By processing multiple frames before generating an interrupt, the interrupt frequency and system bus traffic is reduced.

It will also be readily apparent that the above technique may be used in conjunction with different formatting. For instance, only two control structures per frame would be required for QCIF resolution (one for the closed captioning and one for the odd active video); the even field of active video would not be captured. Alternatively, interlaced video may be produced by sending the even active video and odd active video to two separate buffers. For instance, the even active video may be sent to buffer 111a and the odd active video may be sent to buffer 111b. The controller 108 would cause the display memory 110 to alternatively output even active video data from buffer 111a and odd active video data from buffer 111b for display on an interlaced monitor. In each of the above configurations, however, the closed captioning data may be separately captured while active video is continuously processed and displayed.

Another embodiment of the present invention allows selected portions of active video to be separately captured and processed, in addition to sending the complete frames to display driver 112 for display on display unit 114. In this embodiment, separate control structures are included in the control structure list for the portions to be separately captured. The selected portions of active video data may be sent to separate buffers (such as buffers 116 and/or 117) as described for closed captioning data. In addition, the controller could be configured to also send the selected portions to buffer 111 for display along with the other active video data. Controller 108 loops through the control structures as described above and processes the video data accordingly. An interrupt may be generated when a threshold amount of data is captured in buffer 116 or 117 (such as 15 or 30 frames worth, or after one half second or a full second of video has been processed). CPU 104 then retrieves and processes the selected portions as instructed by application software.

Figure 6:
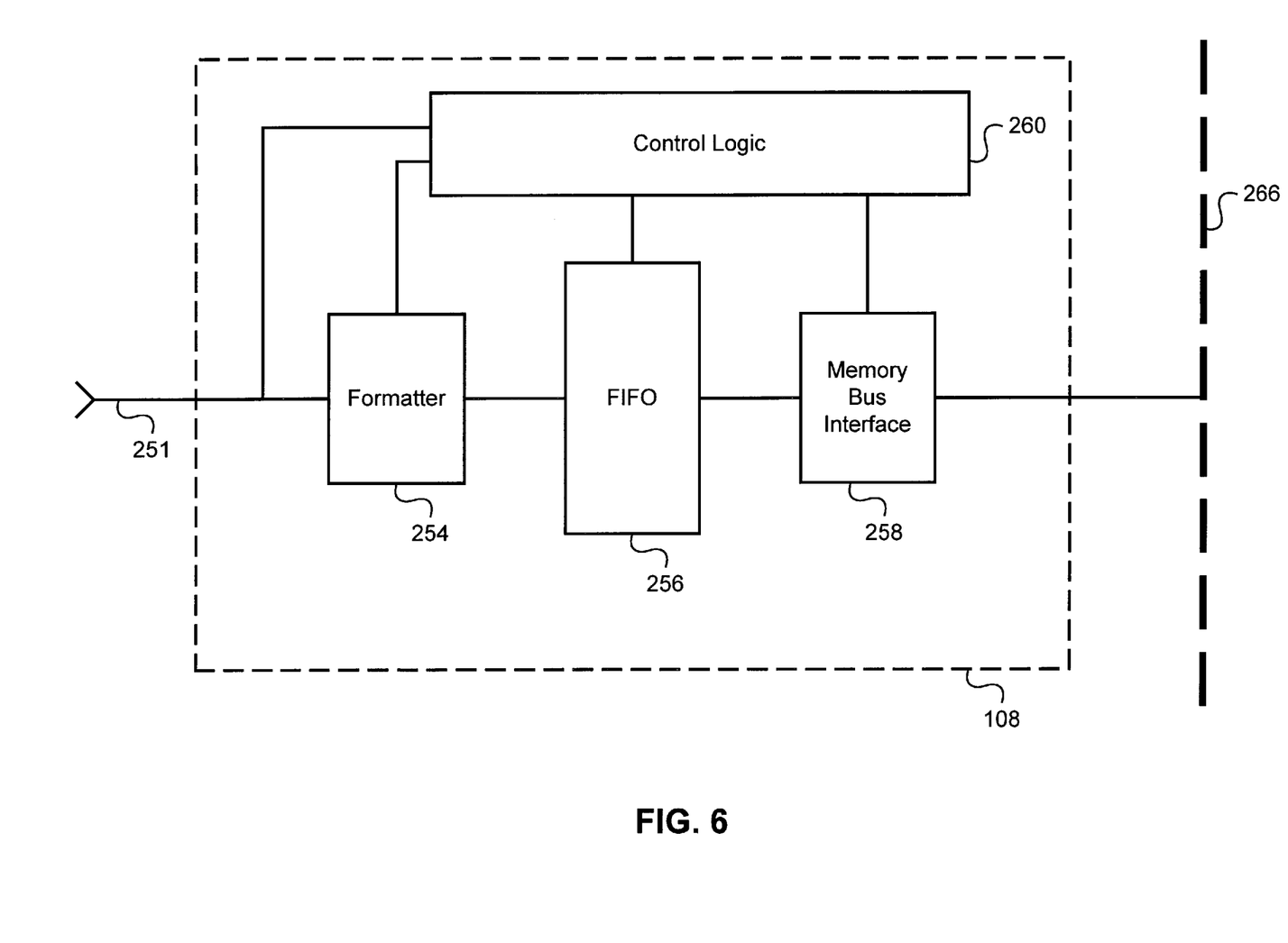
FIG. 6 is a block diagram of a controller according to an exemplary embodiment of the present invention.

The above aspects of the present invention allow video data to be flexibly processed in accordance with instructions from application software. Active video may be continuously displayed and selected portions of the video stream may be separately captured for processing by CPU 104. A relatively simple controller 108 is used and a separate microprocessor is not required. FIG. 6 shows a block diagram of the portion of controller 108 that formats and routes the digital video data from the video stream decoder 102. Controller 108 contains a formatter 254 that initially accepts input from video stream decoder 102 of FIG. 1 through a line 251. Formatter 254 converts the incoming digital video data into a desired format. In the exemplary embodiment, four formats are supported: (1) 4:1:1 format which has four luminance values for each pair of Cr and Cb chrominance values; (2) 4:2:2 format which has four luminance values for every two pairs of Cr and Cb chrominance values; (3) mono which has only luminance values; and (4) an iconized format which is 4:2:2 format downscaled by a factor of four (three of every four pixels are discarded). Formatter 254 simply discards extra chrominance values for each of the formats (all of which are discarded in mono) and for the iconized also discards three out of every four pixels. The formatted pixels are then packed into DWORDs for subsequent storage in display memory 110. As each DWORD is formed, it is inserted into a FIFO 256. The DWORDs are then sent to a memory bus controller 258 and routed to display memory 110 via a memory bus 266.

Controller 108 contains control logic 260 which controls the video processing. The control logic 260 has an internal counter that counts the pixels as they are received on line 251 and keeps track of the current video line number. The control logic 260 also has a set of state registers. The control logic traverses control structure list 130 and retrieves each control structure in turn. The values in each control structure are loaded into the state registers via memory bus interface 258. A finite state machine in the control logic controls the operation of formatter 254, FIFO 256, and memory bus interface 258 according to the internal counter and state registers. After the finite state machine determines that the portion of video data indicated in the current control structure has been processed (which may be determined from the internal line counter), the next control structure is loaded. As described above each control structure can have a unique capture format or can be marked to drop specific lines of a field. In addition, each control structure contains values that determine where the corresponding portion of video data will be stored in the display memory. The finite state machine uses these values to control memory bus interface 258 so the DWORDs of video data from FIFO 256 are sent to the correct location in the display memory 110.

Controller 108 may operate in two clock domains. Digital video data may be received on line 251, formatted by formatter 254 and stored in FIFO 256 according to the video pixel clock rate. The control logic 260 and memory bus interface 258 may operate at a higher memory clock rate (which may be 50 MHz for example). The memory clock allows data to be transferred to and from memory at a much higher rate than is provided by the pixel clock.

Figure 2:
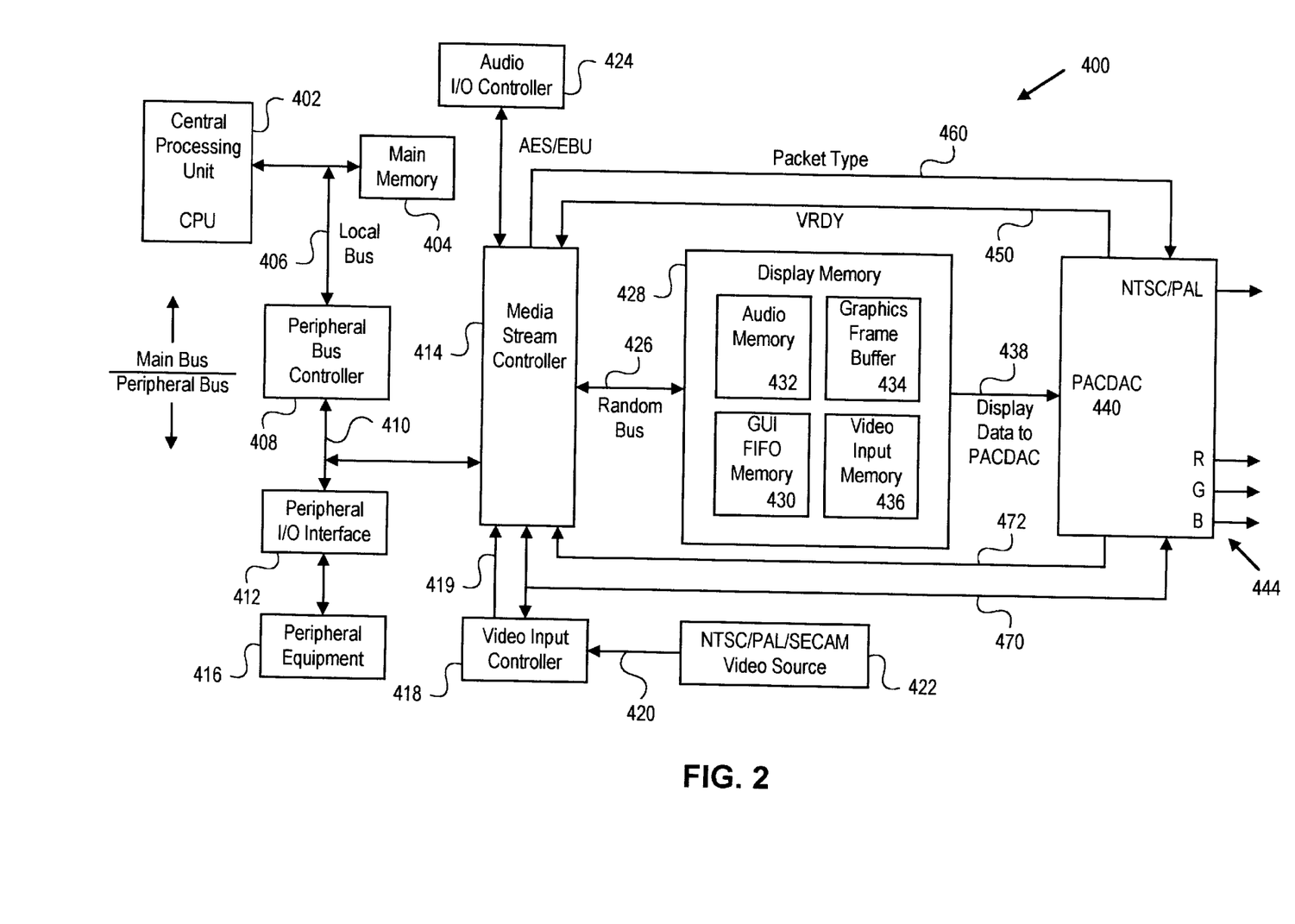
FIG. 2 is a simplified block diagram of a multimedia system incorporating an embodiment of the present invention.

Embodiments of the present invention may be used advantageously in a novel multimedia system. FIG. 2 is a simplified block diagram illustrating such a system, generally indicated at 400, for processing audio, graphics, and video in a personal computer. Referring to FIG. 2, this system includes a central processing unit (CPU) 402 and a main memory 404 for storing both executable commands and data for the system. In the system of FIG. 2, the CPU 402 and the main memory 404 are connected to a local bus 406. System 400 also includes peripheral bus controller 408 connected to the local bus 406. In system 400 the peripheral bus controller 408 provides a PCI bus system although other bus systems may be supported. A peripheral bus 410 has a common connection with the peripheral bus controller 408, with a peripheral I/O interface 412 and with media stream controller 414. While the peripheral bus 410 is coupled to the local bus using peripheral bus controller 408 in this system, other systems may be adapted to support other methods of connecting to the local bus, such as direct connection, buffered connection or connection through a combined cache/bridge. Examples of alternative embodiments have been disclosed in a copending patent application, Ser. No. 08/337,350 filed Nov. 10, 1994 and entitled "System and Method for Generating Video in a Computer System," which is incorporated herein by reference.

Referring to FIG. 2, the peripheral I/O interface 412 is connected to peripheral equipment 416. The peripheral bus 410 in this system may be a PCI bus which provides a data bandwidth of thirty two bits in parallel and which may in the future provide sixty four bits in parallel. The peripheral equipment 416 may illustratively be a printer or disk drive which is operated in accordance with commands from the CPU 402. One of ordinary skill in the art will appreciate the interconnection and operation of these components.

Figure 3:
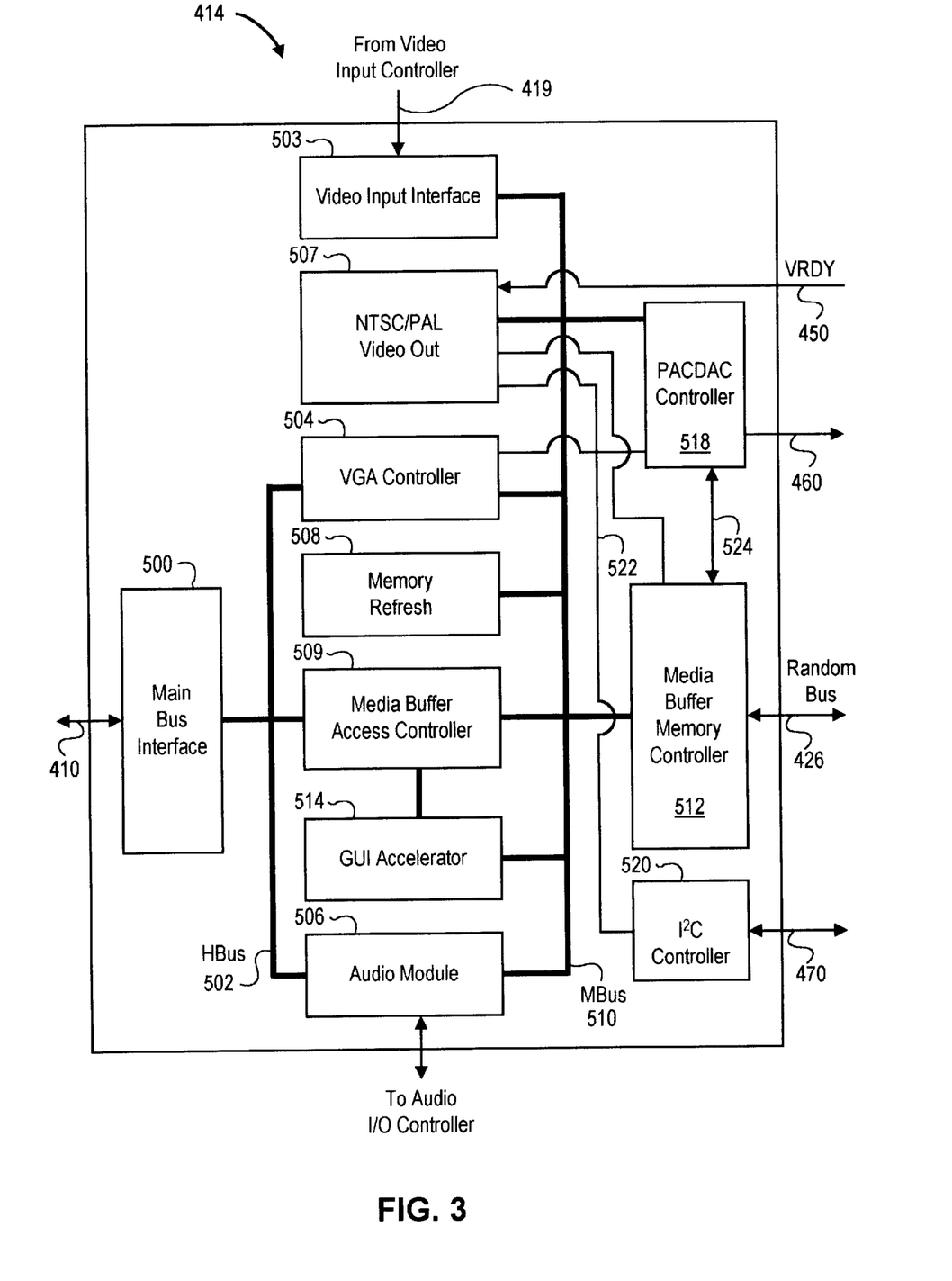
FIG. 3 shows a media stream controller used in the system of FIG. 2.

The peripheral bus 410 shown in FIG. 2 is coupled to a media stream controller 414 shown as a single block in FIG. 2 and as a simplified block diagram in FIG. 3. The media stream controller 414 may be disposed on an integrated circuit chip. Referring to FIG. 2, the media stream controller 414 receives inputs from a video input controller 418. The video input controller 418 receives video inputs through a bus 420 from a video source 422 which may be constructed in a conventional manner. Video input controller 418 of FIG. 2 corresponds generally to video stream decoder 102 of FIG. 1.

The media stream controller 414 also receives inputs from, and provides outputs to, an audio I/O controller 424 which may be constructed in a conventional manner. The audio I/O controller 424 may provide sound output to speakers or some other sound output device (not shown) or receive inputs from a speaker or other sound input device (not shown). Preferably, a standard AES/EBU serial audio interface is used for communication between the media stream controller 414 and audio I/O controller 424.

The audio subsystem and related portions of system 400 are described in further detail in co-pending application Ser. No. 08/337,924 filed Nov. 10, 1994 in the names of Paul B.

Wood and Marc M. Stimak as joint inventors, titled "System and Method for Command Processing and Data Transfer in a Computer System for Sound or the Like," assigned of record to the assignee of record of this application, and which is incorporated herein by reference.

A random bus 426 is common with the media stream controller 414 and a display memory 428. Preferably, random bus 426 allows for a high rate of data transfer between the media stream controller 414 and the display memory 428. In system 400, random bus 426 supports a data transfer rate of approximately 100 megabytes/sec. (100 MBs) and includes a thirty two bit wide data bus.

The display memory 428 has different portions for storing data and control information related to various media subsystems. For example, the display memory 428 has a portion 430 designated as a "GUI FIFO memory" for storing commands on an overflow basis. The GUI FIFO memory portion 430 and related portions of the system are disclosed in detail in co-pending application Ser. No. 08/337,939 (attorney's file D-2793) filed on Nov. 10, 1994 in the names of David C. Baker and Michael D. Asal as joint inventors, titled "System for, and Method of, Processing in Hardware Commands Received from Software without Polling of the Hardware by the Software," assigned of record to the assignee of record of this application, and which is hereby incorporated herein by reference. The display memory 428 also has an audio memory portion 432 for storing information related to digital sound I/O. The audio memory 432 is described in further detail in the above described co-pending application Ser. No. 08/337,924. The display memory 428 also includes a graphics frame buffer memory 434 for storing graphics data, and a video input memory 436 for storing incoming video data. The video input memory 436 corresponds generally to buffer 111 in FIG. 1. A system for storing graphics data and video data in different portions of a display memory is disclosed in detail and claimed in U.S. Pat. No. 5,406,306, assigned of record to the assignee of record of this application, and which is hereby incorporated herein by reference. It will be recognized that not all portions of the display memory 428 need be active or resident at the same time.

The system shown in FIG. 2 uses a video random access memory (VRAM) for display memory 428. While other memories (such as a DRAM) may be used in some embodiments, video random access memory has certain advantages when used for display memory 428 because it operates at a relatively high serial output clock speed and because it includes a serial output register for shifting out digital data taken from different positions in the display memory.

The outputs from the graphics frame buffer memory 434 and the video input memory 436 may be provided on a line 438 designated as "Display Data to PACDAC". The output on the line 438 is provided to PACDAC 140 and may include both data and control information from display memory 428. The term "PACDAC" refers to a packet based digital-to-analog converter (DAC). A PACDAC and related portions of the system are described in detail and claimed in co-pending application Ser. No. 08/214,787 filed Mar. 16, 1994, in the names of David C. Baker and Jonathan I. Siann, titled "Multimedia Graphics System," assigned of record to the assignee of record of this application, and which is hereby incorporated herein by reference. The PACDAC uses a first-in/first-out buffer (FIFO) to buffer video, graphics or control related packets received from display memory 428. The video or graphics related packets may be converted to analog form and output to a video or graphics device. Preferably line 438 allows for a high rate of data transfer between display memory 428 and PACDAC 440. In system 400, line 438 supports a data transfer rate of approximately two hundred megabytes/sec. (200 MBs) and includes a thirty two bit wide data bus.

In addition to receiving data and control information across line 438, PACDAC 440 receives control information from media stream controller 414 across line 460, also designated as "Packet Type" in FIG. 2. This control information indicates the type of packet (video, graphics, control information, etc.) that is being sent to the PACDAC 440 at any given time. PACDAC 440 also provides certain information to media stream controller 414. The PACDAC provides a video ready signal (VRDY) to the media stream controller 414 across line 450, also designated as "VRDY" in FIG. 2. The video ready signal indicates to the media stream controller 414 that PACDAC 440 is ready to receive video related data from display memory 428. The PACDAC 440 also provides media stream controller 414 with certain status information across a bus 470, which is preferably a standard $I^2C$ bus.

Clocking information may also be generated in the PACDAC 440 of the first embodiment. In one embodiment, clock signals having frequencies of approximately 16.9344 Megahertz (MHz) and 24.576 MHz are generated. These clock signals may be provided to the media stream controller 414 across line 472. The 24.576 MHz clock signal may be divided in half by media stream controller 414 to produce a 12.288 MHz clock signal. This provides a 12.288 MHz clock signal in addition to the 16.9344 MHz clock signal. Both the 12.288 MHz and 16.9344 MHz clock signals are used for audio processing in system 400. The 24.576 MHz clock signal may also be doubled (to almost 50 MHz) or quadrupled (to almost 100 MHz) to provide for high speed clocking inside the media stream controller 414. The 16.9344 MHz and 24.576 MHz clock signals are also used in PACDAC 440 to control video and graphics processing.

The PACDAC 440 of the first embodiment may have a random access memory (RAM) and digital-to-analog converters for graphics. For graphics, the binary information in the graphics frame buffer memory 434 may represent positions in a RAM look-up table and these positions may have binary indications representing pseudo colors. These binary indications are converted to analog values by digital-to-analog converters to provide the colors at the different pixel positions on the graphics display monitor through ports 444 labeled RGB. As disclosed in U.S. Pat. No. 5,406,306, video information from video input memory 436 may also be converted to a form compatible with the graphics information for the graphics frame buffer memory 434 and this converted video information may be shown in a display monitor through ports 444.

The primary coordination among the various media components of system 400 is provided by media stream controller 414. Portions of media stream controller 414 are shown in additional detail in FIG. 3. Referring to FIG. 3, the media stream controller 414 communicates with the peripheral bus 410 through a main bus interface 500. The main bus interface 500 is connected to an internal 3-state Hbus 502 allowing communication with various functional modules attached to the Hbus. These modules may include, among other things, a video input interface 503 for receiving video data (which corresponds generally to the portion of controller 108 shown in FIG. 6), a VGA controller 504 for graphics, an audio module 506 for sound, an NTSC/PAL video out module 507 for outputting video data, a memory refresh module 508 for controlling the refresh of the display memory 428, and a media buffer access controller 509 which may allow data to pass through the media stream controller to the display memory via an Mbus 510 and media buffer memory controller 512. A GUI accelerator 514 may also be provided as shown. Other modules such as flash ROM or Yamaha OPL support may also be added to the Hbus.

Each of these modules is connected to an internal Mbus 510 which provides communication with media buffer memory controller 512. The media buffer memory controller 512 is a memory controller for display memory 428, and communicates with the display memory across random bus 426. Each of the modules may transfer packets of data to and/or from the display memory via Mbus 510, media buffer memory controller 512, and random bus 426. It is highly desirable to reduce traffic on Mbus 510 and random bus 426 because they are shared by multiple, high bandwidth multimedia components.

A PACDAC controller 518 is also provided in the media stream controller 414. The PACDAC controller provides control information to PACDAC 440. The PACDAC controller 518 is connected to Mbus 510 and may transfer packets of PACDAC control data to media buffer memory controller 512 over Mbus 510. In addition, the PACDAC controller 518 may send other PACDAC control information to media buffer access controller 512 across line 524. Control information for the PACDAC may then be sent through the display memory 428 to the PACDAC 440. The PACDAC controller 518 also provides signals to PACDAC 440 on line 460, also designated as "Packet Type" in FIG. 2, which indicate whether a packet received by the PACDAC 440 from the display memory 428 contains control information or video or graphics related information.

The VGA controller 504, NTSC/PAL video out 507, PACDAC controller 518, and an I$^2$C controller 520 are connected to, and may communicate across bus 522. The media stream controller 414 may communicate with other portions of the multimedia system of the first embodiment through the video input interface 503, audio module 506, media buffer memory controller 512, PACDAC controller 518, and I$^2$C interface 520. Preferably, standard interfaces such as AES/EBU and I$^2$C are supported.

The video input processing used in the above system will now be described. Video source 422 provides an analog video signal to video input controller 418 over line 420. Video input controller 418 converts the analog video signal into a stream of digital video data. The stream of digital video data preferably comprises a series of sixteen bit values representing video pixels. The video pixel data comprises 8 bits of luminance data and 8 bits of chrominance data in pulse code modulated format. The video input controller 418 can output the video pixel data in one of two formats—a Synchronous Pixel Interface (SPI) that uses an 8 bit wide data path and an Asynchronous Pixel Interface (API) that uses a sixteen bit wide data path. In order to support an 8 bit wide data path for SPI, the video pixel data is transferred synchronously: i.e., 8 bits of chrominance data are output on one clock cycle and 8 bits of luminance data are output on the next clock cycle for each pixel. In order to support scaling to lower resolutions by video input controller 418 while maintaining synchronization, invalid pixel values may be sent for pixels that will be stripped out when the video is displayed at the lower resolution. Two clocks are required to output one pixel in SPI mode, so a 2×clock (twice the pixel clock frequency) is used to output the data. One of the advantages of this mode of operation is that the pin counts on the video input controller 418 and media stream controller 414 can be reduced. An exemplary video input controller 418 for system 400 is the BtV2811 integrated circuit available from Brooktree Corporation, the assignee of the present patent application. The technical specification for the BtV2811 entitled "VideoStream Decoder" dated Feb. 3, 1997 is hereby incorporated herein by reference in its entirety. The 8 bit SPI is preferred in system 400, although both the SPI and API are supported.

Figure 4:
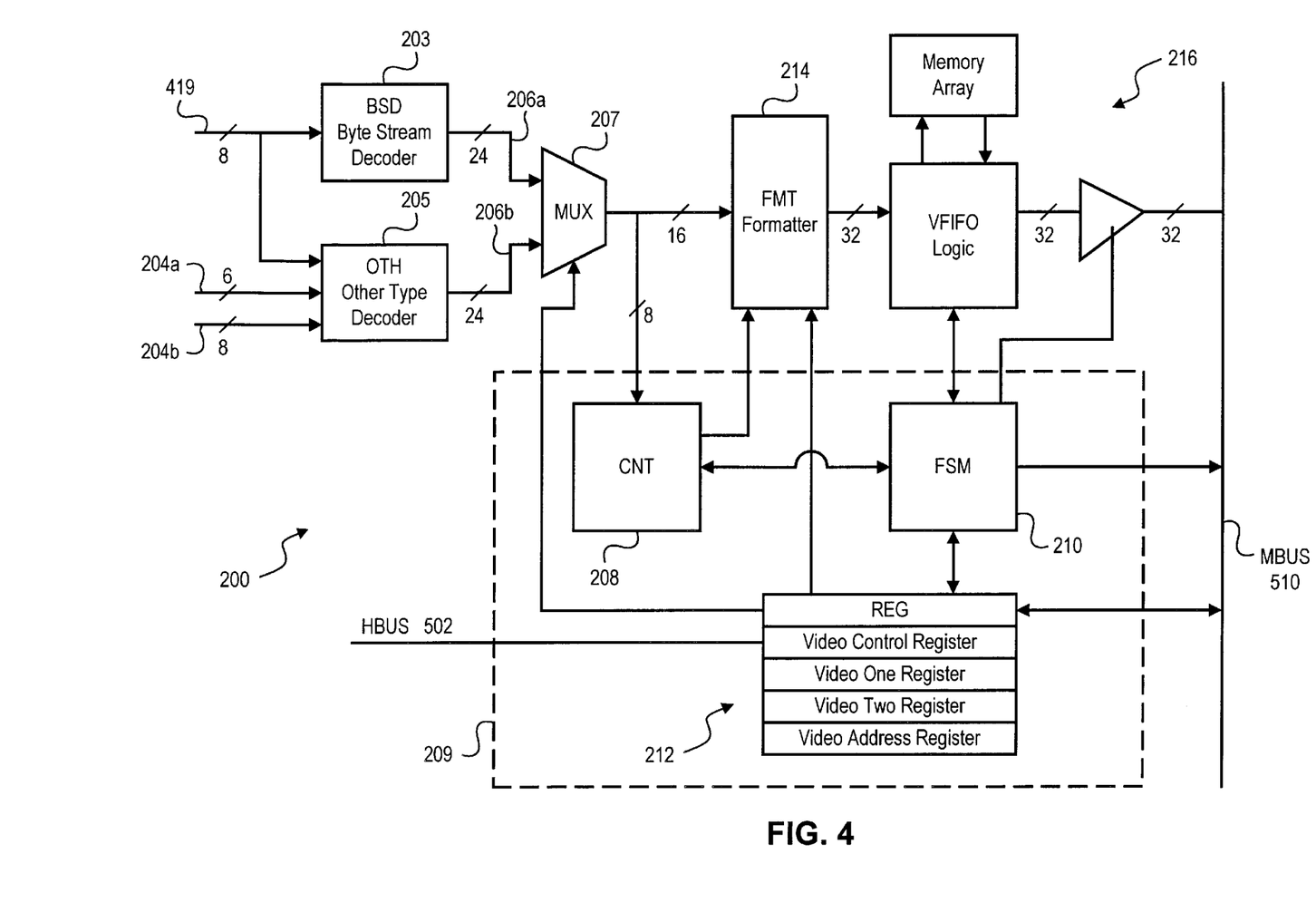
FIG. 4 is a block diagram of a portion of the media stream controller that incorporates aspects of the present invention.

The controller of the present invention resides in video input interface 503 of media stream controller 414. FIG. 4 is a block diagram illustrating the internal structure 200 of a portion of video input interface 503. Video data generated by video input controller 418 of FIG. 2 is preferably received on an 8-bit bus, shown as line 419 in FIG. 4. The 8 bit stream of video data is provided at twice the input pixel frequency (since each pixel requires two serial bytes to be transferred). This data is fed to a Byte Stream Decoder (BSD) 203 for decoding the data stream on line 419, i.e., putting the video pixel data back into a parallel 16 bit luminance/chrominance format. When the API format is used, the video pixel data is provided on a 16-bit bus (from line 419 and line 204a) to a different decoder 205 (called "other type decoder" or OTH).

In both SPI and API modes, an additional 8 bits of control information is provided from the video input controller 418 to the video input interface 503 of media stream controller 414. The control information indicates the start of a new field, whether the current field is even or odd, and the start and end of a line of video. In SPI mode escape sequences are used to provide this control information on the same 8 bit line 419 used to transfer video pixel data. As a result, only 8 pins are required for SPI. The BSD 203 receives the control information when SPI is used and outputs the control information on a separate 8 bit line. Thus, while 8 bits are used to interface between the video input controller 418 and media stream controller 414, the output from BSD 203 is asserted on a 24 bit wide bus 206a (16 bits for video pixel data and 8 bits for control information). API requires 8 additional pins (corresponding to line 204b) to pass the control information from the video input controller 418 to the media stream controller 414, so a total of 24 pins are used for API. The OTH 205 receives the data from these pins and outputs it on a 24 bit wide bus 206b.

A multiplexer (MUX) 207 is connected to both BSD 203 and OTH 205. The MUX 207 simply chooses between the BSD 203 and OTH 205. MUX 207 passes the selected 16 bit video pixel data to Formatter (FMT) 214. MUX 207 passes the 8 bit control information to control logic 209 (shown as a dashed box in FIG. 4). In particular, the control information is sent to a line and pixel counter block (CNT) 208 in control logic 209 which keeps a count of the line and pixel being processed. The control logic 209 will be discussed further below.

Formatter (FMT) 214 receives a stream of 16 bit video pixel data from MUX 206 and converts the data into one of four formats (as determined by the control logic described below). The formatter of system 100 supports the following four formats: (1) 4:1:1 format which has four luminance values for each pair of Cr and Cb chrominance values; (2) 4:2:2 format which has four luminance values for every two pairs of Cr and Cb chrominance values; (3) mono which has only luminance values; and (4) an iconized format which is 4:2:2 format downscaled by a factor of four (three of every four pixels are discarded). Formatter 214 simply discards extra chrominance values for each of the formats (all of which are discarded in mono) and for the iconized format also discards three out of every four pixels. Formatter 214 also discards any invalid pixel values that have been inserted into the stream of digital video data to support scaling to lower resolutions by video input controller 418.

The formatted pixels are then packed into DWORDs for subsequent storage in display memory 428 As each DWORD is formed, it is inserted into a video FIFO (VFIFO) 216. In one embodiment of the present invention, VFIFO 216 uses FIFO logic and a 16×32 memory array, although a conventional FIFO may be used as well. The video pixel data is loaded into the VFIFO 216 at the video pixel frequency. When the video pixel data is removed from VFIFO 216, however, it may be transferred to display memory 110 using a separate clocking domain (in this case, a 50 MHz memory bus clock or "MCLK" domain). The MCLK domain allows high speed data transfer from the media stream controller 414 to display memory 428 which provides additional bandwidth for use by other multimedia modules (e.g., VGA Controller 504, Audio Module 506, etc.) within the media stream controller 414. The DWORDs of video pixel data are removed from VFIFO 216 and transferred across MBUS 510 through media buffer memory controller 512 (shown in FIG. 5) and into the desired storage location in display memory 428.

Control logic 209 controls the formatting and routing of the digital video data in portion 200 of the video input interface 503. In particular, control logic 209 determines the format used by formatter 214 as well as the rate that data is retrieved from VFIFO 216 and the destination of that data in the display memory. Control logic 209 includes CNT 208, a bank of state registers (REG) 212 which hold a variety of control values, and a Finite State Machine (FSM) 210. CNT 208 receives control information from video input controller 418, and keeps track of the line and pixel being processed. CNT 208 also determines whether an even or odd field is being processed. The REG 212 hold control values, many of which are loaded from control structures stored in the display memory. The function and format of some of the registers in REG 212 are described in Tables 1–4 below. Table 1 shows the contents of an exemplary video control register which contains various control bits for the finite state machine 212.

TABLE 1

Video Control Register

| Bit | Field Name | Description |
|---|---|---|
| 7 | Enable Video | 0=Reset video subsystem<br>1=Enable video input processing. This bit should be held at zero until after clock selection is made in accordance with bit 6 of this register. This bit is reset by the pause function in the control structures |
| 6 | Clock Select | 0=Use 50 MHz MCLK<br>1=Use video input clock.<br>Set this bit to one if a BtV2811 is known to be present from I²C inquiries. Once the clock bit is set then the enable video bit (bit 7 of this register) can be set on a subsequent I/O operation. |
| 5:3 | Reserved | |
| 2 | Enable Parallel Decoder | PCI-Bus only<br>0=BtV2811 interface (SPI)<br>1=Parallel decoder interface (API) |
| 1:0 | Reserved | |

Tables 2 and 3 show the contents of an exemplary video one register and video two register respectively.

TABLE 2

Video One Register

| Bit | Description |
|---|---|
| 7:1 | Reserved |
| 0 | Select PACDAC Controller Video FIFO 1 B. This bit can be set or reset by the control structures.<br>0=Use video buffer A on video FIFO 1 at the top of next frame<br>1=Use video buffer B on video FIFO 1 at the top of next frame |

TABLE 3

Video Two Register

| Bit | Description |
|---|---|
| 7:1 | Reserved |
| 0 | Select PACDAC Controller Video FIFO 2B. This bit can be set or reset by the control structures.<br>0=Use video buffer A on video FIFO 2 at the top of next frame<br>1=Use video buffer B on video FIFO 2 at the top of next frame |

The media stream controller 414 and PACDAC 440 support two double buffered video windows. A separate portion of video input memory 436 is used for each window (referred to as video window 1 and video window 2). Each window has two portions (referred to as buffer A and buffer B) to support double buffering. PACDAC 440 may have separate video FIFOs (referred to as video FIFO 1 and video FIFO 2) to receive video data from each video window in the display memory. The single bit in the video one register and video two register indicates whether buffer A or buffer B of the respective video window should be used for the next frame. The PACDAC Controller 518 (shown in FIG. 3) will then cause data from the selected buffer to be sent to the selected PACDAC video FIFO for the next frame. This allows direct software control of double buffering for video transfer from display memory 428 to PACDAC 440.

Table four shows the contents of an exemplary video address register.

TABLE 4

Video Address Register

| Bit(s) | Field Name | Description |
|---|---|---|
| 31:22 | Current Tag | Read Only view of tag field of control structure in process. Reset to zero by chip reset. Not defined when enable video (bit 7 of video control register) is not set. |
| 21:2 | Structure Address | VRAM DWORD address of first structure in the control structure list. Note: this always points to an INIT STRUCTURE followed by a variable number of control structures. |
| 1:0 | Reserved | |

The structure address field in this register is used at the end of every list of control structures to determine where to begin the next list of control structures.

The finite state machine (FSM) 210 uses the information from CNT 208 and the state registers 212 to control the formatting and routing of digital video data in accordance with a list of control structures stored in the display memory. FSM 210 is controlled by values loaded into REG 212. The application software loads some of these values at initialization over HBUS 502. Most values are loaded from control structures that are stored by the application software in display memory 428. The software sets up a list of control structures in display memory 428, and each control structure tells the video input interface how to treat a corresponding portion of the stream of digital video data (what format, where to buffer it in display memory, etc.). The software can load the list of control structures into display memory 428 in advance of video processing using memory mapped I/O. FSM 210 traverses the list of control structures and loads values from the control structures into REG 212 to control video processing. By varying the control information in the control structures, complex and flexible video input processing can be achieved with the simple circuit shown in FIG. 4.

The address of the list of control structures in display memory 428 is initially loaded into the video address register (see Table 4) in REG 212. The application software can set this register via HBUS 510. As was discussed in connection with FIG. 1, the list of control structures starts with an init structure and is followed by a list of control structures. For each control structure, a specified amount of data is captured and formatted according to the information in the control structure. The last control structure has a flag that indicates that the list has been exhausted. FSM 210 then goes back to the address pointed to by the video address register at the top of the list. Note also that by changing the video address register, the FSM 210 can be caused to switch to a different list of control structures to process the next portion of the video stream.

The format of the init structure and control structures used in system 100 is set forth in Tables 5–8 below. Table 5 shows the format of control information in the init structure.

TABLE 5

Init Structure

| Bit(s) | Field Name | Description |
|---|---|---|
| 31:30 | Reserved | |
| 29:20 | BLANK SRC PIXELS | Max number of video source pixels that can be captured on a vertical blanked line. |
| 19:10 | ACTIVE SRC PIXELS | Max number of video source pixels that can be captured on a vertical active line. |
| 9:0 | VERT RELOAD | Vertical line Counter reload value. |

The init structure contains maximum values for the number of pixels that may be captured for a single blanked or active line of video. These values are used to safeguard against capturing too much data on a line (which may overflow the buffer in the display memory) in the event that video is being received in a fast forward format or other unexpected format.

Each control structure in system 100 contains three DWORDs. Note that the overall control of the video input is determined by sequentially reading in a list of these structures into REG 212 and/or as direct inputs to the FSM 210. The control structure (which comprises a DWORD0, a DWORD1, and a DWORD2) is described in Tables 6–8.

TABLE 6

Capture Control Structure DWORD0

| Bit(s) | Field Name | | Description |
|---|---|---|---|
| 31 | END_OF_LIST | 0= | Process the next sequential control structure. |
| | | 1= | This is the last control structure in the list. Find the next one to process by following the Video Address Register pointer. |
| 30 | SET VIDEO INTERRUPT | 1= | Set the video interrupt flag at the end of processing this control structure. |
| 29 | PAUSE | 0= | Continue video list processing at end of processing this structure. |

TABLE 6-continued

Capture Control Structure DWORD0

| Bit(s) | Field Name | | Description |
|---|---|---|---|
| | | 1= | Reset the enable_video bit, VCR[7] at the end of processing this structure and after all data has been stored in VRAM. |
| 28:27 | FORMAT | 00= | 4:2:2 |
| | | 01= | 4:1:1 |
| | | 10= | mono (Y only) |
| | | 11= | iconized format (4 to 1 decimation of 4:2:2) |
| 26 | SCAN | 0= | Even field only |
| | | 1= | Odd field only |
| 25 | DROP | 0= | Normal operation, write to VRAM |
| | | 1= | Drop this field |
| 24 | CHROMA_MODE | | PCI-Bus only |
| | | 1= | Enable chroma keying on luminance LSB (see "Parallel Decoder Interface" on page 278 of technical specification for BtV2115) |
| | | 0= | Pass LSB Y through to BtV2487 |
| 23 | V2 SELECT ENABLE | 0= | No change in buffer selection |
| | | 1= | DWORD0[21] selects video 2 A/B buffer |
| 22 | V1 SELECT ENABLE | 0= | No change in buffer selection |
| | | 1= | DWORD0[20] selects video 1 A/B buffer |
| 21 | V2SELECT | 0= | Video 2 use buffer A for next frame |
| | | 1= | Video 2 use buffer B for next frame |
| 20 | V1SELECT | 0= | Video 1 use buffer A for next frame |
| | | 1= | Video 1 use buffer B for next frame |
| 19:10 | | | Reserved |
| 9:0 | STARTING VERTICAL LINE | | Matched against byte stream decoder vertical line count to determine when to start data transfer for this control structure. |

TABLE 7

Capture Control Structure DWORD1

| Bit(s) | Field Name | Description |
|---|---|---|
| 31:29 | Reserved | |
| 28:11 | DWORD LINE PITCH | Number of DWORDs to add to address of start of line capture. The 2 LSBs of this address must be zero, i.e., this pointer should point to a 4 DWORD (16 byte) aligned location in VRAM. |
| 10 | Reserved | |
| 9:0 | VERTICAL LINE EXTENT | Number of vertical lines to be transferred by the control structure. |

TABLE 8

Capture Control Structure DWORD2

| Bit(s) | Field Name | Description |
|---|---|---|
| 31:22 | TAG | This tag field is visible in the video address register when this control structure is being processed. |
| 21:2 | MBUS ADDRESS | VRAM DWORD address pointer to location in VRAM to store data captured by this control structure. The 2 LSBs of this address must be zero, i.e., this pointer must point to a 4 DWORD (16 byte) aligned location in VRAM. |
| 1:0 | Reserved | |

Among other things, the control structure includes the starting vertical line (Table 6) for the capture (which tells the FSM which vertical line to start capturing data according to the format and other information in the control structure) and the vertical line extent (Table 7) (which tells the FSM how many lines of data to capture and transfer into VRAM using settings from the current control structure before moving onto the next control structure in the list). In Table 6, the scan bit (bit number 26) indicates whether the control structure corresponds to an even or odd field. If the next field received by the video input interface 503 is of the wrong type, FSM 210 causes formatter 214 to discard the field; the capture will not begin until the next field is received. In Table 6, the format bits (bits 27–28) are used to control which of the four supported formats is applied by formatter 214. As discussed above with reference to the exemplary embodiment of FIGS. 1 and 6, the formatter 214 may discard chrominance data (or entire pixels for iconized format) from the video stream to achieve the desired compression. In addition, a drop bit (bit 25 in Table 6) may be set to cause formatter 214 to discard all of the lines of video data corresponding to the current control structure. The address used to store the resulting formatted video data in the display memory is indicated by the MBUS address (bits 2–31 in Table 8). The lines of video data corresponding to the control structure are stored sequentially starting at the MBUS address. After each line, the address is incremented by the number of DWORDs indicated by the DWORD line pitch (bits 11–28 in Table 7).

Figure 5:
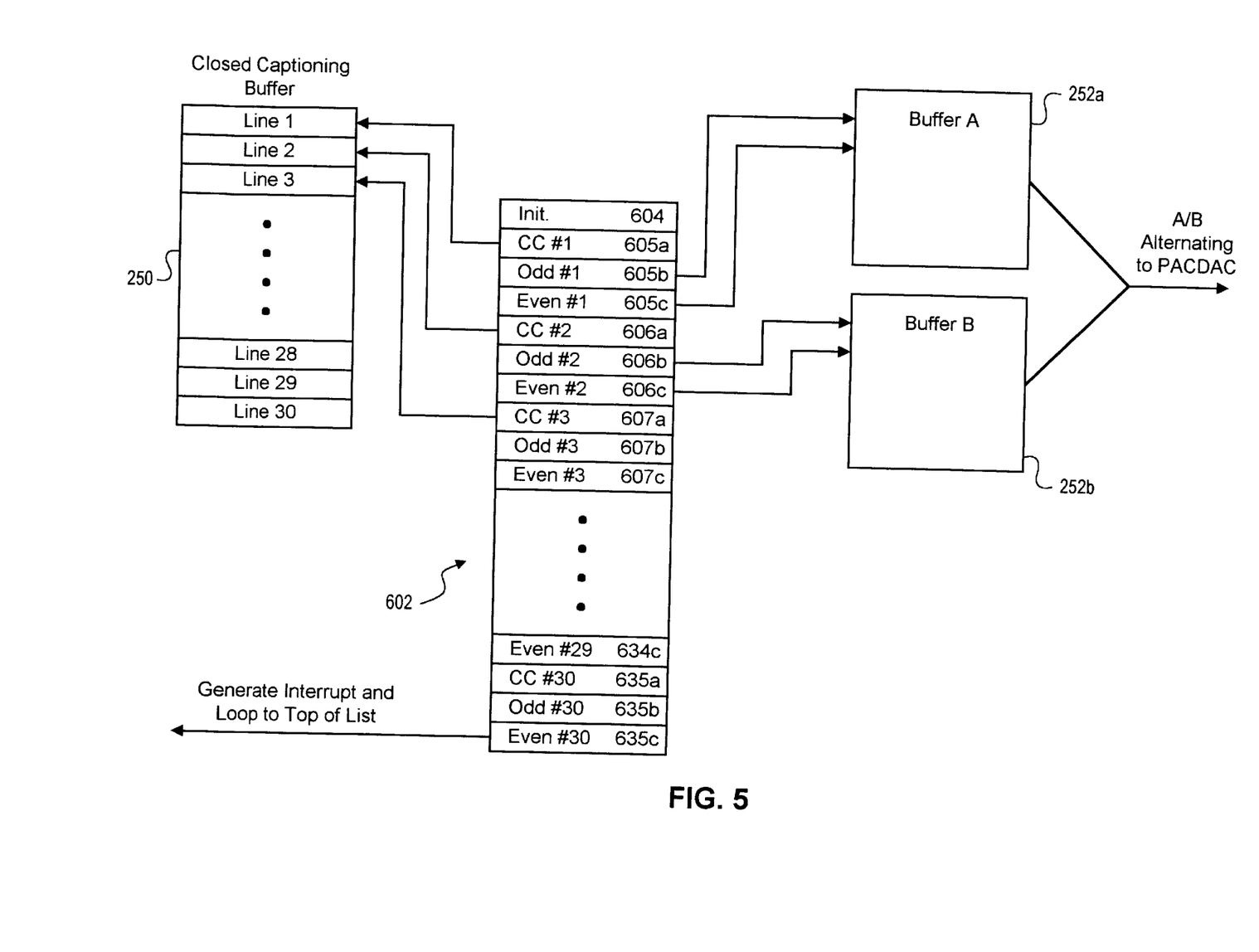
FIG. 5 is a schematic illustrating how closed captioning data is captured in an embodiment of the present invention.

The above control structures may be used to process video in a manner similar to that described for the exemplary embodiment of FIGS. 1 and 6. A further example will now be described with reference to FIG. 5. FIG. 5 is a block diagram illustrating how active video data and closed captioning data may be captured in accordance with an exemplary list of control structures 602. The list of control structures 602 comprises an init structure 604 followed by ninety control structures (605a–635c). Three control structures are used to process each frame of video data and the list of control structures is set up to process thirty sequential frames. The first control structure for each frame is set up to capture closed captioning data from line 21 of the odd field. Exemplary settings in the control structure would be FORMAT=mono, SCAN=odd, STARTING VERTICAL LINE=21, DWORD LINE PITCH=number of DWORDS in a line, VERTICAL LINE EXTENT=number of video lines to capture (in this case 1), and MBUS ADDRESS=the address of a corresponding line in closed captioning buffer 250. Each control structure corresponding to closed captioning data has an MBUS address pointing to a different line in closed captioning buffer 250, so the lines containing closed captioning data are accumulated in buffer 250 in display memory 428. The second control structure for each frame is set up to capture active video data from the odd field. Exemplary settings in the control structure would be FORMAT=4:1:1, SCAN=odd, STARTING VERTICAL LINE=32, DWORD LINE PITCH=twice the number of DWORDs in a line, VERTICAL LINE EXTENT=number of lines to capture, and MBUS ADDRESS=the address of the first odd line address in buffer 252A or B (the V1SELECT bit in the last control structure for each frame will be set to cause the frames to alternate between buffer A and B for double buffering). The third control structure for each frame is set up to capture active video data from the even field. Exemplary settings in the control structure would be FORMAT=4:1:1, SCAN=even, STARTING VERTICAL LINE=32, DWORD LINE PITCH=twice the number of DWORDs in a line, VERTICAL LINE EXTENT=number of lines to capture, and MBUS ADDRESS=the address of the first even line address in buffer 252A or B (the V1SELECT bit will be set to cause the frames to alternate between buffer A and B for double buffering). In addition to the above settings, the last control structure 635c may have the END_OF_LIST and SET VIDEO INTERRUPT bits set.

FSM 210 loops through the list and processes the corresponding portions of the video stream accordingly. After each frame of video data is processed, closed captioning buffer 250 contains the closed captioning data from the frame, and either buffer A or B contains the deinterlaced active video for the frame. While one of the buffers A or B is being loaded, the other buffer may be sent to the PACDAC for display. This process continues until the last control structure 635c is completed after which the FSM 210 generates an interrupt to the CPU. For the exemplary list shown in FIG. 5, 30 frames of video data are processed before the interrupt is generated. For video streams with 30 frames per second, one second of closed captioning data is captured before an interrupt is generated. The CPU may then retrieve the closed captioning data for further processing.

The last control structure may have the pause bit set, so the FSM 210 does not loop to the top of the list and overwrite the closed captioning data in buffer 250 until the CPU has read the closed captioning data. Alternatively, a double buffering system can be used for the closed captioning data. While the CPU is reading the closed captioning data from one buffer, a list of control structures may be capturing more data into a second buffer for incoming closed captioning data. This may be accomplished by loading the address of the second list into the video address register when the first list has been completed. Alternatively, a single list of control structures that is twice as long may be used. The first thirty control structures for capturing closed captioning data would have addresses corresponding to a first closed captioning buffer, and the second thirty control structures for capturing closed captioning data would have addresses corresponding to a second closed captioning buffer. The SET VIDEO INTERRUPT bit would be set in the middle of the list after the first thirty frames have been processed as well as at the end of the list after the second thirty frames have been processed. After the first interrupt the CPU would retrieve data from the first closed captioning buffer and after the second interrupt the CPU would retrieve data from the second closed captioning buffer. This double buffering allows continuous video processing with infrequent interrupts for processing closed captioning data (or other selected portions of the video stream).

Thus, the control structures allow closed captioning to be buffered separately while live video may be sent to PACDAC 440 for display. An interrupt is only generated when a desired threshold amount of closed captioning data has been captured. This reduces interrupt frequency and system bus traffic. The CPU may use efficient block transfer commands to retrieve the entire closed captioning buffer at once, rather than retrieving each line of closed captioning data piecemeal. The amount of closed captioning data that is captured before an interrupt is generated is determined solely by the list of control structures and, as a result, may be flexibly determined by application software at run time. For instance, if the application software downloads a list of control structures that is half as long, an interrupt will be generated twice as often. Alternatively a higher interrupt frequency can be achieved by setting the interrupt bit in a control structure in the middle of the list as well as at the end.

In another embodiment of the present invention, a list of control structures can be used to capture closed captioning data while displaying a small icon sized video window.

The CPU can search the closed captioning data for specific words or phrases (such as the name of a specific company or news event) while a small video icon is displayed in the corner of the display screen. When the word or phrase is detected by the CPU, application software may automatically load a new list of control structures into display memory 428 and change the value in the video address register. The new list of control structures may change the video format and enlarge the display so a viewer can observe the broadcast that used the selected word or phrase.

The above application may be implemented using a relatively long list of control structures and very small buffers in the display memory for the closed captioning and iconified video. A list of control structures may be setup to process 30 frames of video as described above with the last control structure configured to generate an interrupt. Each frame is processed by a set of two control structures (3 DWORDs in each structure). The first structure corresponds to the closed captioning data and has settings as described above. The second structure corresponds to the active video data for the odd field and has an MBUS ADDRESS pointing to a single small buffer in the display memory. The FORMAT in the second control structure is set to iconized format (4 to 1 decimation of 4:2:2).

Each closed captioning structure points to a different line in a closed captioning buffer while each icon structure points to the same video buffer. The CPU will be interrupted once per second to process an entire second's worth of closed captioning information. This requires approximately 181 DWORDs to hold the structure list, 4K DWORDs to hold the closed captioning and 256 DWORDs to hold the video icon.

To allow for interrupt latency in the CPU, the actual structure may be configured to process closed captioning data in a double-buffered fashion. Two closed captioning buffers may be used. The list of control structures may be twice as long (i.e., capturing 60 frames) with interrupts generated in the middle of the list (after 30 frames) and at the end of the list (after 60 frames). In one embodiment, the TAG (see Table 8) is set to "01h" for the control structures used to capture the first thirty frames worth of closed captioning data, and the TAG is set to "02h" for the control structures used to capture the second thirty frames worth of closed captioning data. Software can view the TAG field to determine which second's worth of closed captioning data is currently being processed, and can retrieve the other second's worth of closed captioning data without interfering with ongoing processing.

The foregoing description is presented to enable any person skilled in the art to make and use the invention. Descriptions of specific designs are provided only as examples. Various modifications to the preferred embodiment will be readily apparent to those skilled in the art, and the generic principles defined herein may be applied to other embodiments and applications without departing from the spirit and scope of the invention. For instance, any variety of data can be sent during the vertical blanking interval, such as text data sent according to the teletext protocol. Aspects of the present invention are easily adapted to capture such data as well as portions of the active video data. In addition, embodiments of the present invention may use control structures that correspond to a certain range of pixels (rather than vertical lines) in the video stream. In such embodiments, specific ranges of video pixel data may be separately captured and processed without requiring that entire vertical lines be captured.

While this invention has been described and illustrated with reference to particular embodiments, it will be readily apparent to those skilled in the art that the scope of the present invention is not limited to the disclosed embodiments but, on the contrary, is intended to cover numerous other modifications and equivalent arrangements which are included within the spirit and scope of the following claims.

We claim:

1. A system for processing an analog video signal in accordance with instructions from an application software, comprising:

a video decoder for converting the analog video signal to digital data;

a display memory for storing data for display;

a control structure list located in the display memory;

the control structure list containing a plurality of control structures, the contents of which being supplied by said application software; and a controller for processing said digital data in accordance with said control structures.

2. The system of claim 1 wherein said analog video signal contains encoded text, wherein said controller is capable of separating said digital data into a video portion and a text portion, and wherein said control structure list contains at least one control structure for controlling said video portion and at least one control structure for controlling said text portion.

3. The system of claim 2 further comprising:

a first buffer for storing said text portion; and means for generating an interrupt when said first buffer is substantially full.

4. The system of claim 3 further comprising a second buffer, said first and said second buffers forming a double buffering system.

5. The system of claim 4 wherein said first and said second buffers are located in said display memory.

6. The system of claim 1 further comprising:

wherein the display memory stores said digital data processed by said controller;

a display driver for generating analog video signal from said digital data stored in said display memory;

a CPU;

said control structure list containing a first type of control structures and a second type of control structures; and said controller storing digital data processed in accordance with said first and said second types of control structures to said display memory, said controller also causing said CPU to further process digital data corresponding to said first type of control structures.

7. The system of claim 1 wherein said analog video signal contains encoded text, wherein said control structure list contains at least a first control structure for controlling video and at least a second control structure for controlling said encoded text, and wherein said controller processes said encoded text in accordance with said second control structure.

8. The system of claim 7 further comprising:

a first buffer for storing said encoded text; and means for generating an interrupt when said first buffer is substantially full.

9. The system of claim 8 further comprising a second buffer, said first and said second buffers forming a double buffering system.

10. A multimedia system for digitally processing analog video signal, comprising:

a CPU;

a display memory for storing video and graphic data;

a video decoder for converting said analog video signal to digital data;

means for generating a control structure list containing a plurality of control structures, said control structures being stored in said display memory;

a controller for generating digital video data from said digital data in accordance with said control structures and for storing said digital video data in said display memory; and a display driver for converting said digital video data stored in said display memory into corresponding analog signals.

11. A system for processing a video signal comprising a series of frames in accordance with instructions from an application software, comprising:

a processing unit for executing the application software;

a main memory associated with the processing unit;

a peripheral memory;

a bus system operatively coupling the main memory and the peripheral memory; and a video processing system associated with the peripheral memory for processing the video signal;

wherein the video processing system includes:

a circuit for sending a selected portion of the video signal from a plurality of frames to the peripheral memory for storage;

a circuit for detecting when the selected portion of the video signal for a threshold number of frames has been stored in the peripheral memory; and a circuit for allowing the selected portion of the video signal for the threshold number of frames to be transferred to the main memory for use by the application software.

12. The system of claim 11 wherein the circuit for allowing the selected portion of the video signal for the threshold number of frames to be transferred to the main memory for use by the application software includes means for generating an interrupt signal.

13. The system of claim 11 wherein the video processing system is programmable such that the application software is capable of setting the threshold number of frames.

14. The system of claim 11 wherein the video processing system is programmable such that the application software is capable of setting the selected portion of video signal to be stored in the peripheral memory.

15. The system of claim 11, further comprising a display device;

wherein at least a portion of the peripheral memory stores data to be displayed on the display device.

16. The system of claim 11, wherein the application software stores control information in the peripheral memory and the video processing system processes the video signal in accordance with the control information.

17. The system of claim 16 wherein the control information includes the threshold number of frames.

18. The method of claim 17 wherein the threshold number of frames is at least thirty.

19. The system of claim 16 wherein the control information includes information defining the selected portion of the video signal.

20. The method of claim 19 wherein the video signal contains encoded text and the selected portion of the video signal is the portion containing encoded text.

21. The system of claim 11 wherein the threshold number of frames is at least thirty.

22. The system of claim 11 wherein said video signal contains encoded text and the selected portion of the video signal is the portion containing encoded text.

23. The system of claim 22, wherein the encoded text is closed captioning data and the selected portion of the video signal is the portion of the blanking interval containing the closed captioning data.

24. The system of claim 22, wherein the encoded text is teletext data and the selected portion of the video signal is the portion of the blanking interval containing the teletext data.

25. The system of claim 11 wherein at least a full second of the video signal is processed before the selected portion of the video signal for the threshold number of frames is transferred to the main memory.

26. The system of claim 11 further comprising a display device;

wherein the video processing system further comprises:

a circuit for sending a different portion of the video signal from a plurality of frames to the peripheral memory for storage; and a circuit for causing the different portion of the video signal for the plurality of frames to be transferred to the display device for display.

27. The method of claim 26 wherein the application software stores control information in the peripheral memory and the video processing system processes the video signal in accordance with the control information.

28. The method of claim 27 wherein a first portion of the control information contains information for processing the selected portion of the video signal and a second portion of the control information contains information for processing the different porion of the video signal.

29. In a system including a processing unit, a main memory and a bus system operatively coupling the processing unit and the main memory, a method for capturing data from a video signal comprising a series of frames, the method comprising the steps of:

providing a peripheral memory operatively coupled to the bus system;

capturing data from a desired portion of each frame of the video signal;

storing the data in the peripheral memory;

determining each time that a desired amount of the data is captured and stored in the peripheral memory, wherein the desired amount includes the desired portion of a plurality of the frames of the video signal; and transferring the desired amount of the data across the bus system to the main memory each time the desired amount of the data is captured.

30. The method of claim 29 wherein the step of transferring the desired amount of the data further comprises the steps of generating an interrupt signal and using interrupt processing by the processing unit to transfer the desired amount of the data.

31. The method of claim 29 further comprising the step of using the processing unit to program the desired amount in accordance with instructions from an application software.

32. The method of claim 29 further comprising the step of using the processing unit to program the selected portion in accordance with instructions from an application software.

33. The method of claim 29 wherein the desired amount includes the desired portion of at least thirty frames.

34. The method of claim 29 wherein said video signal contains encoded text and the selected portion of the video signal is the portion containing encoded text.

35. The method of claim 29 wherein at least a full second of the video signal is processed each time the desired amount of the data is captured.

36. The method of claim 29 further comprising the step of:

sending a different portion of the video signal from a plurality of frames to a display device for display.

* * * * *